INVENTOR.
FARSHEED ABIDI

BY
ATTORNEY

United States Patent Office 3,460,785
Patented Aug. 12, 1969

3,460,785
EQUIPMENT SUPPORT
Farsheed Abidi, Jackson Heights, N.Y., assignor to Pullman Incorporated, Chicago, Ill., a corporation of Delaware
Filed Oct. 10, 1967, Ser. No. 674,253
Int. Cl. F16m 1/00
U.S. Cl. 248—17                    5 Claims

ABSTRACT OF THE DISCLOSURE

An equipment support and guide adapted for use under high or low temperatures in which expansion or contraction of lever arms acting in unison operate to compensate for the expansion of the body being supported or guided and to maintain a constant tension on the body.

---

This invention relates to equipment supports. More specifically, this invention relates to a device suitable for supporting heavy loads under conditions of high temperature.

Equipment supports and guides are widely used in industrial applications. Examples of certain types of equipment supports and guides are those adapted for supporting equipment internally of a vessel in which vessel, supports and the equipment supported are all subject to high operating temperatures. In those instances where the vessel is internally insulated and the supports and internally supported equipment are subjected to high operating temperatures, vessel, supports and supported equipment all being physically interconnected, design problems may result due to the differential thermal expansion involved. Equipment supports suitable for use under conditions of high temperature expansion may be of the type which compensate for differential expansion between related objects or of the type which compensate for elongation resulting from expansion of a single piece of equipment under high temperature. Expansion difficulties are amplified when all interconnected equipment cannot be properly supported from the same support system due to physical or space limitations.

Such limitations are frequently imposed, for example, in the regenerator of a fluid catalytic cracking unit in which a multiplicity of cyclone separators are physically interrelated but the separators must be supported and hung separately. Due to space limitations, the separators are usually supported at different elevations. The net result of these differences in support elevations and temperatures between the insulated shell wall and vessel internals cause large mechanical forces which tend to break the equipment.

Accordingly, it is the object of this invention to provide a simple equipment support and guide.

It is a further object of this invention to provide an equipment support suitable for use under conditions of high differential expansion or contraction.

It is another object of this invention to provide an equipment support suitable for supporting different pieces of equipment at different elevations.

It is yet another object of this invention to provide an equipment support suitable for supporting equipment at an elevated temperature from a comparatively low temperature vessel wall.

These and other objects of this invention are accomplished by means of the equipment support of this invention which comprises a first lever arm adapted for pivotal attachment at its first end to the wall of a vessel, a plate pivotally attached to the second end of said first lever arm, a second lever arm adapted for pivotal attachment at its first end to the wall of a vessel at a point lower on said vessel wall than said first lever arm, the second end of said second lever arm being pivotally attached to said plate, a third, or carrying arm pivotally attached to said plate at its first end, the second end of said third arm dependent therefrom and adapted for attaching to the equipment to be supported.

Reference is now made to the attached drawings, FIGURES 1 and 2 in which.

Figure 1:
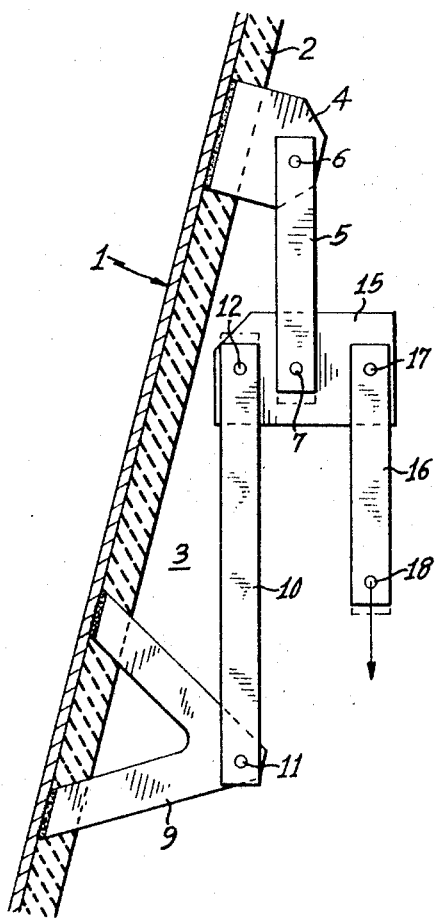
FIGURE 1 is an elevation view of one embodiment of this invention.

The embodiment depicted in FIGURE 1 is adapted for support under conditions equivalent to a downward movement of a load. In FIGURE 1, vessel wall 1, internally insulated by insulation layer 2, forms vessel internal space 3. Attached to the internal side of vessel wall 1 is member 4. Attachment is made in any suitable manner, such as by welding. Lever arm 5 is pivotally attached to member 4 at pivot 6 at its one end and to plate 15 at pivot 7 at its opposite end. Plate 15 is advantageously an elongated member.

In a similar arrangement, member 9 is attached to the internal side of vessel wall 1, with lever arm 10 being pivotally attached at its one end to member 9 at pivot 11 and to plate 15 at its other end at pivot 12. Pivot 12 is located on plate 15 between vessel wall 1 and pivot 7. Carrying arm 16 is pivotally attached to plate 15 at pivot 17 and depends downward from plate 15, having its lower end 18 adapted for attachment to the equipment to be supported.

The embodiment depicted in FIGURE 1 and described above is adapted for support under conditions resulting in the equivalent of a downward movement of lower end 18 and carrying arm 16, that is, when the movement of the load is in a downward direction. Under conditions of elevated temperature and attendant expansion, arm 5 elongates downward and arm 10 elongates upward. These combined elongational movements result in a downward, clockwise movement at pivot 17 and, resultingly, of lower end 18 of carrying arm 16. The extent of the movement produced at point 17 is the summation of the movements of lever arms 5 and 10 as a function of the distances between the three pivot points 12, 7 and 17 located on plate 15.

Figure 2:
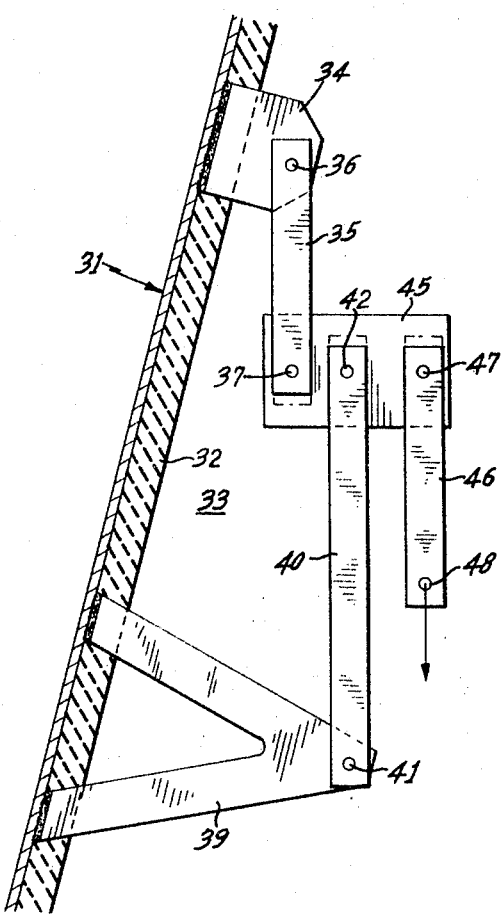
FIGURE 2 is an elevation view of a second embodiment of this invention.

Referring now to FIGURE 2, this embodiment is adapted for guiding under conditions of high temperature resulting in an upward movement of a point. In FIGURE 2, vessel wall 31, internally insulated by insulation layer 32, forms vessel internal space 33. Attached to the internal side of vessel wall 31 is a member 34. Attachment is made in any suitable manner, such as by welding. Lever arm 35 is pivotally attached to member 34 at pivot 36 at its one end, and to plate 45 to pivot 37 at its opposite end.

In a similar arrangement, member 39 is attached to the internal side of vessel wall 31, with lever arm 40 being pivotally attached at its one end to member 39 at pivot 41 and to plate 45 at its other end at pivot 42. Pivot 37 of lever arm 35 is located between vessel wall 31 and pivot 42. Carrying arm 46 is pivotally attached to plate 45 at pivot 47 and depends downward from plate 45, having its lower end 48 adapted for attachment to the equipment to be guided.

In this instance under conditions of elevated temperature and attendant expansion, arm 35 elongates downward and arm 40 elongates upward and the resultant motion is in a counter-clockwise direction so that pivot 47 moves upward as does carrying arm 46 and load attachment point 48. The principle of movement in this instance is comparable to that involved in the previous embodiment described.

No specific distances are required in respect to the distances between the points of attachment of the three arms to the elongated member, that is, to the distances between the points 12, 7 and 17 on member 15. It will be evident, however, that that distance between points 7 and 17 should preferably be greater than that distance between points 7 and 12.

Neither need these points lie in a common horizontal plane. Pivots 12 and 7, in effect, establish a point between them around which they mutually pivot, as do points 42 and 37 in the second embodiment. If these two points lie in a horizontal plane with their mutual pivot point, however, the operability of the support will be facilitated.

Neither is it necessary that the elongated member, 15 or 45, whose length is provided to assure room for the attachment thereto of the three arms, be located in a horizontal plane. Being so oriented, however, does simplify the operation of the invention and does act to minimize any tendency of the supported object to move out of a vertical path during its movement.

Suitable materials of construction for the various components comprising the equipment supports described herein are metals or any other materials undergoing reasonable, known expansion with temperature changes. It is desirable, but not necessary, that the same materials be used for the lever arms. As to dimensions of the various members, the necessary lengths as interrelated to expansion can be easily determined, as can the necessary thicknesses, to insure that the members do not unduly distort under conditions of high temperatures.

While emphasis has been placed throughout this discussion on the use of the apparatus of this invention for support of expanding members under high temperature conditions, the apparatus of this invention is easily adapted to use for guiding contracting members under low temperature conditions. The embodiment shown in FIGURE 2 is particularly so suited under conditions of low temperature, carrying or support arm 46 tends to move downward in the direction of the contracting load.

It will be obvious to one skilled in the art that many variations can be made to either of the embodiments as described herein without departing from the scope of the invention. For example, variations can be made in respect to means of attachments of the various members to each other, or members of different sizes and shapes than those illustrated can be employed. However, none of these changes are considered as being outside of the scope of my invention.

Having described my invention, I claim:
1. An equipment support within a walled vessel comprising an elongated member;
   a first lever arm pivotally attached at its lower end to said elongated member;
   means for pivotally attaching said first lever arm at its upper end to the wall of the vessel;
   a second lever arm pivotally attached at its upper end to the elongated member;
   means for pivotally attaching said second lever arm at its lower end to said wall of the vessel;
   a carrying arm pivotally attached at its upper end to the elongated member, and
   means for attaching the carrying arm at its lower end to the equipment to be supported.
2. The support described in claim 1 in which said first lever arm is attached to said member between the attachments of said second lever arm and said carrying arm to said member.
3. The support described in claim 1 in which said second lever arm is attached to said member between the attachments of said first lever arm and said carrying arm to said member.
4. The support described in claim 1 in which the points of attachments of said arms to said member lie in a common horizontal plane.
5. The support described in claim 1 in which the distance between the point of attachment of said first lever arm to said member and the point of attachment of said carrying arm to said member is greater than the distance between the point of attachment of said first lever arm to said member and the point of attachment of said second lever arm to said member.

References Cited

UNITED STATES PATENTS

| 1,757,343 | 5/1930 | Steinmuller | 248—17 XR |
| 2,904,410 | 9/1959 | Traue | 23—288 |
| 3,217,119 | 11/1965 | Suozzo | 248—54 XR |

ROY D. FRAZIER, Primary Examiner

J. F. FOSS, Assistant Examiner

U.S. Cl. X.R.

23—288; 248—284, 324